No. 879,332. PATENTED FEB. 18, 1908.
C. S. SHARP.
RIDING ATTACHMENT FOR HARROWS.
APPLICATION FILED SEPT. 16, 1907.

2 SHEETS—SHEET 2.

Witnesses:
J. N. Daggett
F. W. Hoffmeister

Inventor:
Charles S. Sharp
By E. W. Burgess
Attorney

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

RIDING ATTACHMENT FOR HARROWS.

No. 879,332.          Specification of Letters Patent.          Patented Feb. 18, 1908.

Application filed September 16, 1907. Serial No. 392,966.

*To all whom it may concern:*

Be it known that I, CHARLES S. SHARP, a citizen of the United States, residing at Auburn, in the county of Cayuga and State of New York, have invented certain new and useful Improvements in Riding Attachments for Harrows, of which the following is a specification.

My invention relates to riding attachments for harrows designed to be attached to the draft members of the harrow and to trail in rear thereof, the object being to provide an attachment of the kind indicated that may be cheaply constructed, strong and durable, and one that will oppose a minimum of resistance to any change in the direction of movement of the harrow.

I attain these objects by the mechanism illustrated in the accompanying drawings in which—

Figure 1:
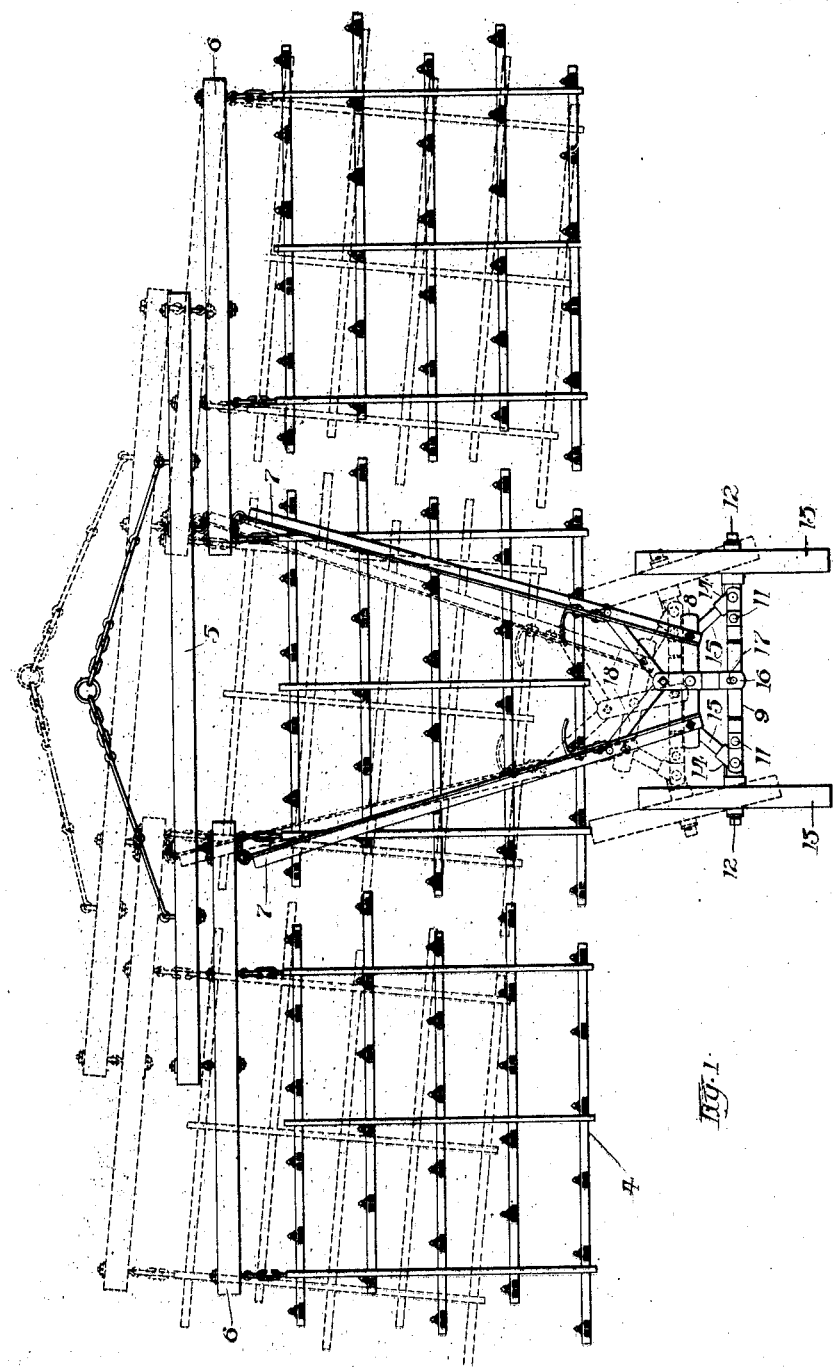
Figure 2:
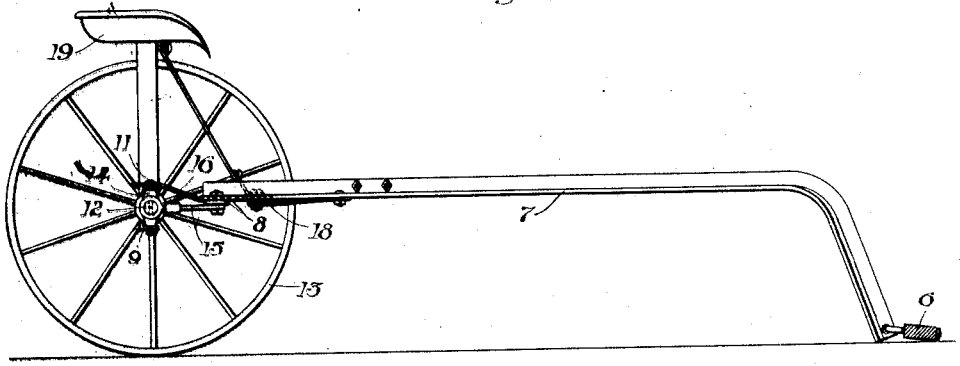
Figure 3:
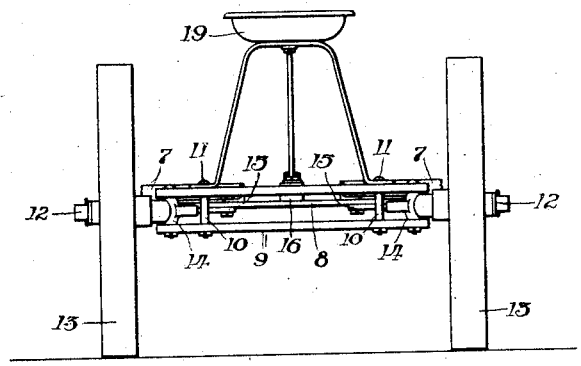

Figure 1 is a top plan view of the harrow showing my improved attachment connected therewith; Fig. 2 is a side elevation of the attachment; and Fig. 3 is an end view of Fig. 2.

Referring to the drawings wherein like reference numerals designate the same parts throughout the several views. A common form of harrow is designated by the numeral 4, and 5 represents a draft appliance connected therewith by means of the members 6 having suitable connections with the harrow sections.

7 represents reach bars overhanging the harrow having their forward ends flexibly connected with the draft members 6 and their rear ends pivotally connected with opposite ends of a bar 8, arranged substantially parallel with the draft members 6; 9 is a truck axle comprising upper and lower members spaced apart by means of thimbles 10, and secured by means of bolts 11.

12 designates journals upon which are mounted carrying wheels 13; the journals being pivotally connected with opposite ends of the axle by means of vertically arranged hinge joints 14 and having forwardly projecting arms 15; the forward ends of said arms being preferably pivotally connected with opposite ends of the bar 8 coaxially with the connections between said reach bars and said bar. A supplemental bar 16 is pivotally connected with the bar 8 intermediate the pivotal connections of the reach bars, having its rear end provided with an elongated opening 17 by means of which it is slidably and pivotally connected with the truck axle and its forward end pivotally connected with the rear ends of a pair of oppositely disposed links 18 that have their front ends pivotally connected with the reach bars; the arrangement being such as to sustain the parts against undue flexure resulting from the weight of the operator in the seat 19.

What I claim as my invention and desire to secure by Letters Patent is:

1. In a riding attachment for harrows, the combination of a harrow and draft members connected therewith, a truck axle, journals connected with opposite ends of said axle by means of vertically arranged hinge joints, carrying wheels mounted on said journals, forwardly projecting arms forming part of said journals, reach bars overhanging the harrow, said bars having their forward ends connected with said draft members and their rear ends pivotally connected with opposite ends of a bar arranged substantially parallel with said draft members, said forwardly projecting arms being pivotally connected with opposite ends of said bar, a supplemental bar pivotally connected with said first mentioned bar intermediate the pivotal connections of said reach bars therewith, said supplemental bar having its rear end pivotally connected directly with said axle and its front end pivotally connected with said reach bars by means of oppositely arranged links.

2. In a riding attachment for harrows, the combination of a harrow and draft members connected therewith, a truck axle, journals connected with opposite ends of said axle by means of vertically arranged hinge joints, carrying wheels mounted on said journals, forwardly projecting arms forming part of said journals, reach bars overhanging the harrow, said bars having their forward ends connected with said draft members and their rear ends pivotally connected with a bar arranged substantially parallel with said draft members, said forwardly projecting arms being pivotally connected with opposite ends of said bar coaxially with said reach bars, a supplemental bar pivotally connected with said first mentioned bar intermediate the pivotal connections of said reach bars therewith, said supplemental bar having its rear end pivotally connected directly with said axle and its front end pivotally connected with said reach bars by means of oppositely arranged links.

3. In a riding attachment for harrows, the combination of a harrow and draft members connected therewith, a truck axle, journals connected with opposite ends of said axle by means of vertically arranged hinge joints, carrying wheels mounted on said journals, forwardly projecting arms forming part of said journals, reach bars overhanging the harrow, said bars having their forward ends connected with said draft members and their rear ends pivotally connected with opposite ends of a bar arranged substantially parallel with said draft members, said forwardly projecting arms being pivotally connected with opposite ends of said bar coaxially with said reach bars, a supplemental bar pivotally connected with said first mentioned bar intermediate the pivotal connections of said reach bars therewith, said supplemental bar having its rear end pivotally and slidably connected directly with said axle and its front end pivotally connected with said reach bars by means of oppositely arranged links.

CHARLES S. SHARP.

Witnesses:
H. A. DAVIS,
H. S. KIMBALL.